United States Patent [19]
Van Leeuwen

[11] 3,918,483
[45] Nov. 11, 1975

[54] FILTER CAP FOR DRAIN VALVES

[76] Inventor: Roger A. Van Leeuwen, 7039 E. 40th, Tulsa, Okla. 74145

[22] Filed: Nov. 29, 1974

[21] Appl. No.: 528,501

Related U.S. Application Data

[63] Continuation-in-part of Ser. No. 333,967, Feb. 20, 1973, abandoned.

[52] U.S. Cl. .................................. 137/550; 61/13
[51] Int. Cl.² ... E03B 3/18; E03B 7/07; E02B 13/00
[58] Field of Search ........... 239/200, 201, 599, 601, 239/602; 61/11, 12, 13; 137/550; 210/454, 448, 449, 136

[56] References Cited
UNITED STATES PATENTS

| | | |
|---|---|---|
| 888,217 | 5/1908 | Bishop .................................. 61/13 |
| 1,897,572 | 2/1933 | Cornell, Jr. ........................ 137/550 |
| 2,729,228 | 1/1956 | Stevenson ........................... 137/550 |
| 2,798,768 | 7/1957 | Babin ...................................... 61/13 |
| 3,046,747 | 7/1962 | Timpe ..................................... 61/13 |
| 3,302,408 | 2/1967 | Schmid .................................. 61/13 |
| 3,406,715 | 10/1968 | Hruby, Jr. ........................... 137/550 |
| 3,429,125 | 2/1969 | Shotton ................................. 61/12 |
| 3,546,884 | 9/1968 | Timpe ..................................... 61/13 |

*Primary Examiner*—Lloyd L. King
*Attorney, Agent, or Firm*—Head & Johnson

[57] ABSTRACT

This disclosure describes an improvement in drain valves for underground irrigation piping systems. The improvement comprises a perforated cap to fit over the end of the drain valve. Included inside the cap is a pad of porous material to be used as a filter or strainer to clean out and retain the dirt and foreign matter that might be carried with water which flows or back-flows into the drain valve.

4 Claims, 6 Drawing Figures

U.S. Patent  Nov. 11, 1975  3,918,483
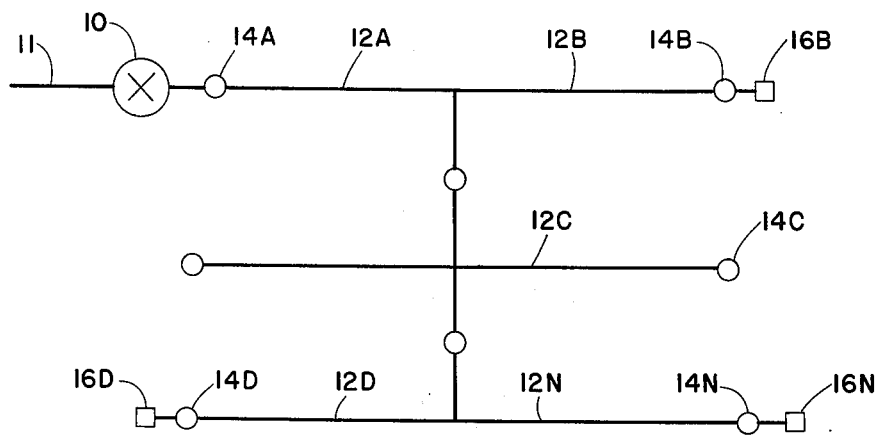
Fig. 1
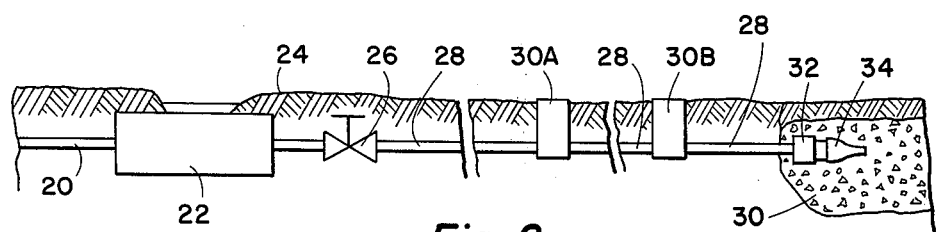
Fig. 2
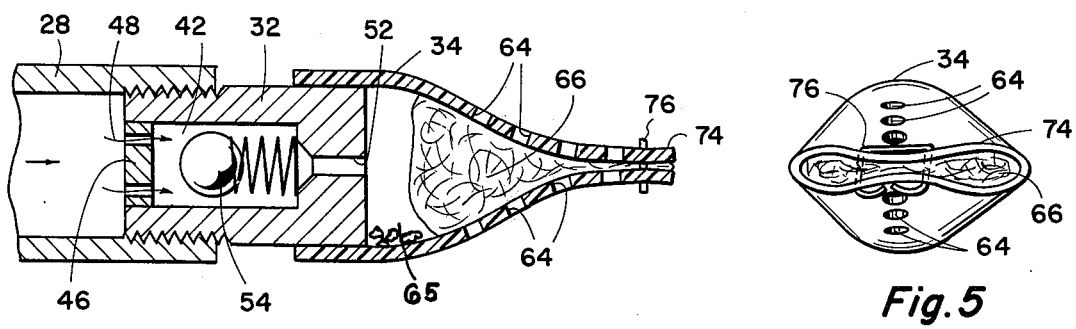
Fig. 3
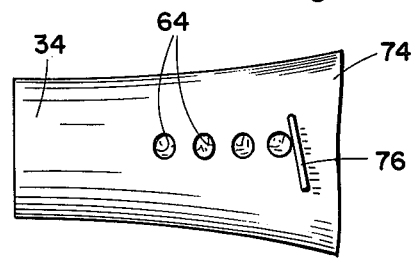
Fig. 5
Fig. 4
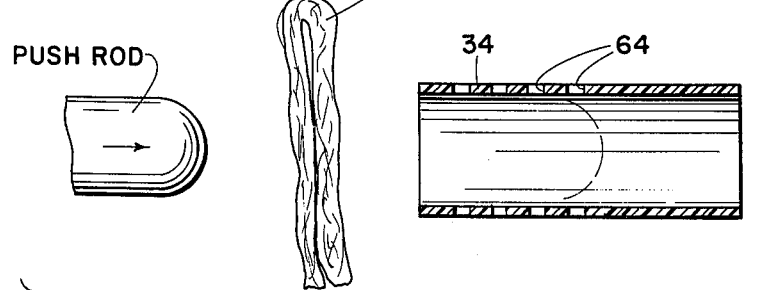
Fig. 6

FILTER CAP FOR DRAIN VALVES

RELATED APPLICATIONS

This invention is a continuation-in-part of copending application Ser. No. 333,967, filed Feb. 20, 1973, now abandoned.

BACKGROUND OF THE INVENTION

This invention lies in the field of underground irrigation piping systems. More particularly, it is concerned with maintenance of drain valves which are installed on such underground piping systems. In such systems when the pressure is reduced to a low value, check valves usually located in the ends of one or more lines of pipe open. This permits liquid to drain from the pipes into a porous (gravel-filled) sump prepared in the earth adjacent the check valve in the end of the pipe. In an extension network of piping, where a plurality of such drain valves may be used, these may be at different elevations in the earth. Consequently there is a siphoning or reverse flow action from one valve to another at a lower elevation with a consequent influx of water from the sump surrounding the higher elevation drain valve. This water may carry dirt and debris which if it enters the system can plug the drain valve and prevent its proper operation. With inoperable drain valves, water is retained in the piping, which during freezing ambient conditions, will cause great damage to the underground irrigation system. The need is evident in a typical 18- hole golf course of 332 sprinkler heads, 22,742 feet of lateral piping and about 167 drain valves.

The drain valves are usually a spring loaded ball check type as for examples shown in U.S. Pat. No. 3,406,715, with or without the outlet screen. Because the outlet of such check valves is of necessity small, e.g., ⅛-inch opening, they can become easily plugged with debris, stones, small particles of sand, grass, roots, etc., and become inoperative. That is the valve will not allow either normal outflow drainage or backflow as set forth above. The use of a screen as shown in the art further restricts effective opening area and hence the free flow of water therefrom. A fixed screen formed as a part of the valve outlet must contend with not only debris from the sump when back-flow conditions exist but also be able to contend with materials such as debris, rust, algae, sediment, etc., in the irrigation water. During normal drain flow operations such materials will collect on the inside of the fixed screen thus shutting off drain flow and the consequential damaging conditions. When such materials are trapped within the drain valve they can also collect under the valve and prevent its closing.

In addition, underground irrigation systems use automatic valves that open rapidly creating high pressure surges until the lines have refilled with liquid. Surges of 3 to 4 times the normal operating pressures are not uncommon, e.g., surges of 450 to 600 psi. Rigid screens or filters must be able to withstand these surges (plus their flow reversals) plus impact of particles, within the surge, traveling at high velocities.

The servicing of drain valve filters preferably quickly and without their replacement is another desired need not fulfilled by the prior art devices.

SUMMARY OF THE INVENTION

It is a primary object of this invention to provide an attachment for conventional drain check valves, preferably those without outlet screens, as are used on subsurface piping systems for irrigation purposes. This object is realized and the limitations of the prior art devices are overcome in this invention by providing a perforated cap which can be pressed by an easily removable slip fit over the outlet end of conventional and known drain valves. These caps contain a pad of glass wool or other porous filter material which, while they permit the ordinary outflow of the draining water, will permit back-flow or inflow of filtered water under siphoning conditions which may occur. In addition a sediment collection space is provided in the construction between the outlet of the valve and the filter material of this invention to collect debris, etc., from the water supply system.

In addition it is an object of this invention to provide an attachment for slip fit on drain valves that includes a filter capable of absorbing high velocity particles and shock during start up of an underground sprinkler and irrigation system.

BRIEF DESCRIPTION OF THE DRAWINGS

These and other objects of this invention and a better understanding of the principles and details of the invention will be evident from the following description taken in conjunction with the appended drawings, in which:

FIG. 1 represents, in schematic form, a possible pipe system for underground sprinkler operations.

FIG. 2 illustrates some detail of one line of pipe of the system of FIG. 1.

FIG. 3 is a sectional view of a drain valve and the filter of the present invention.

FIGS. 4 and 5 are respectively top plan and end views of the filter of this invention.

FIG. 6 is a schematic view showing the method of constructing the filter of this invention.

DESCRIPTION OF THE PREFERRED EMBODIMENT

Referring now to the drawings, there is shown in FIG. 1 a hypothetical piping system which is set under the surface of the ground for the purpose of supplying water to a plurality of sprinklers which are set in the ground at the surface of the ground. This comprises a pipe 11 supplying water to the system, a valve 10 which can be a manual or remote automatically controlled valve, and a plurality of lengths of pipe 12A, 12B, 12C . . . 12N. These are connected in any desired geometrical arrangement so as to space a plurality of sprinkler elements 14A and 14B, 14C, 14D . . . 14N in a desired arrangement so as to fully irrigate the area. On one or more of the pipelines such as 12B, 12D and 12N, there are installed one or more drain valves and sumps identified by numerals 16B, 16D and 16N, by means of which the pipes will be drained of water at any time that the valve 10 is closed and the water pressure lowered from an input pipe 20 leading to a water meter 22 and control valve 26. The water meter and valve are installed below the surface 24 of the earth as are the pipes 28 and sprinkler nozzles 30A, 30B for example. On the end of the pipe 28 is a drain valve 32 and filter 34 of this invention, the construction of which is best illustrated in FIG. 3. When the valve 26 is closed and pressure falls in pipe 28 the check valve 32 which heretofore has prevented the outflow of liquid under the pressure of water in the line, opens and permits water to slowly drain out of the pipe 28 through the filter and into a sump of rock and sand 32 which has been prepared as a porous volume to absorb the liquid draining from the pipe.

Referring to FIG. 3 there is shown a prior art type of drain valve 32 threadably connected to pipe 28. The drain comprises a cylinder of metal made of noncorrosive material such as brass. There is a bored section 42 of large diameter and an axial drilled hole 52 in the closed end of the block. There may be flats machined on the cylinder so that a wrench can be used to tighten the valve into an appropriate fitting. A metal sphere or ball 54 is inserted into the space 42 and is locked inside by pressing a perforated disc 46 into the opening. Perforations 48 permit water flow into the space 42 and out through the opening 52. This flow of water under pressure in the pipe causes the ball 54 to flow toward the opening 52 and seat across the mouth of the opening in such a way as to seal the flow of water out through the opening 52. Thus when the system is in operation and water under pressure fills the pipes, the valve is closed. The sprinklers can operate under a maintained high pressure in the pipe. However, when the main valve, such as 26, is closed the pressure will drop in the pipe 28, the ball will fall away from the seat and water can then drain slowly out of the piping system through the opening 52 into the porous earth 32.

Assume, for example, that valves 16B and 16D are at two different elevations, due to the slope of the surface of the earth between these two locations. When those valves are open there will be a tendency for water to siphon out of valve 16D draining the pipes 12D and 12B and causing a back-flow of water at valve 16B. This back-flow of water may carry into the valve dirt and debris from which can do damage to the operation of the valve 38, either by stopping the opening 52 or preventing a proper seating of the ball against the opening 52.

The filter 34 of this invention involves a cylindrical portion of such size as to be slip fitted at one end over the end of the drain valve 32. The portion is perforated at 64. There is a pad of filtering material, such as glass wool, identified by numeral 66 in the end of the cap so that any water which may back-flow through the perforations 64 through the pad 66 and through the opening 52 into the pipe will be filtered.

The filter cap 34 can either be a molded plastic cap indicated in FIG. 3 or it can be a short length of plastic tubing which is flattened on one end 74. It can be held closed by either cement or mechanical means, such as stainless steel wire staple 76. It need not be a true seal since the tube 70 is perforated with a plurality of perforations 64. The pad 66 of filtering material is inserted into an opened end of tubing as shown in FIG. 5. The end 74 is crimped and stapled.

While the improvement of this invention, namely the filter cap, is indicated as being molded or made from plastic material any desired composition of material can be used which has the necessary properties, including metal. Also any desired filter material that has the capability of filtering out dirt particles and other debris can be used. One good example is, of course, plural folded fiberglass pads and another might be plastic fibers of other types such as polyethylene, nylon, etc.

An important feature of the usage of the invention is the provision of a sediment collecting space 65, between the end of the valve and the filter 66, for particles present in the water used for irrigation or sprinkling.

Hence the invention, in use, provides a greater area of flow and water distribution depending upon its length, number of perforations 64 or extent of the rear opening provided, no matter if a sump 30 is present or not.

While the invention has been described with a certain degree of particularity it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In an underground irrigation piping system having one or a plurality of check drain valves, each with an outlet in the end wall of a valve housing, said valves being at separated parts of the piping system, the improvement comprising:
    a. a cup shaped rigid enclosure adapted at a first end to be telescopically and removably retained by a slip fit over said housing having said outlet to said drain valve, said enclosure having a plurality of openings at a second end; and
    b. a pad of porous and resilient filter material inert to underground soil and fluids and retained inside and substantially filling the internal crosssection of said enclosure opposite said openings of said second end of said enclosure leaving a sediment collecting space defined by the internal walls of said enclosure between said drain valve outlet and said filter material.

2. The piping system as in claim 1 in which said enclosure comprises a short length of tubing and means at said second end to retain said tubing flattened and a plurality of perforations near said flattened portion of said tubing.

3. The system as in claim 1 in which said pad of porous filter material comprises a pad of glass fibers.

4. The system as in claim 1 in which said pad of porous filter material comprises a pad of plastic fibers.

* * * * *